(12) United States Patent
Michael et al.

(10) Patent No.: US 12,250,318 B2
(45) Date of Patent: Mar. 11, 2025

(54) PORTABLE ENCRYPTION DEVICE WITH MULTIPLE KEYS

(71) Applicant: iStorage Ltd, Middlesex (GB)

(72) Inventors: John Michael, London (GB); Quan Xu, Middlesex (GB)

(73) Assignee: iStorage Ltd, Middlesex (GB)

( * ) Notice: Subject to any disclaimer, the term of this patent is extended or adjusted under 35 U.S.C. 154(b) by 235 days.

(21) Appl. No.: 17/848,937

(22) Filed: Jun. 24, 2022

(65) Prior Publication Data
US 2023/0421378 A1 Dec. 28, 2023

(30) Foreign Application Priority Data
Jun. 24, 2021 (GB) .................... 2109075.8

(51) Int. Cl.
*H04L 9/32* (2006.01)
*H04L 9/08* (2006.01)

(52) U.S. Cl.
CPC .......... *H04L 9/3231* (2013.01); *H04L 9/0869* (2013.01); *H04L 9/0894* (2013.01)

(58) Field of Classification Search
None
See application file for complete search history.

(56) References Cited

U.S. PATENT DOCUMENTS 9,286,493 B2 * 3/2016 Johnson ............... G06F 21/10
11,340,823 B2 * 5/2022 Ben Dayan ........... G06F 3/064

* cited by examiner

*Primary Examiner* — Jeffrey R Swearingen
(74) *Attorney, Agent, or Firm* — NIXON PEABODY LLP

(57) ABSTRACT

A device (100;120;140) and method (600) for storing encryption keys are provided. The device comprises: a first connector for connection to a computer, an internal memory (104); an input module (101); and an authentication module (103) for receiving user identification information, via the input module, from a user. The authentication module is configured to check received user identification information against stored user identification information stored on the internal memory to determine if a user is a valid user. A first data encryption key, DEK, is stored in encrypted form on the internal memory and is associated with the stored user identification information of a first plurality of user identities, and a second DEK is stored in encrypted form on the internal memory and is associated with the stored user identification information of a second, different, plurality of user identities. When a user enters user identification information corresponding to stored user identification information of one of the first plurality of user identities, the authentication module is configured to decrypt the first DEK for use by the user. When a user enters user identification information corresponding to stored user identification information of one of the second plurality of user identities, the authentication module is configured to decrypt the second DEK for use by the another user. Each decrypted DEK may be used for the encryption and decryption of data. Further DEKs may be stored on the device, each further DEK associated with a respective plurality of user identities.

11 Claims, 6 Drawing Sheets

PORTABLE ENCRYPTION DEVICE WITH MULTIPLE KEYS

PRIORITY CLAIM

The present application claims priority to United Kingdom Application No. GB2109075.8, filed Jun. 24, 2021. The entirety of this application is hereby incorporated by reference.

The present disclosure relates to a device for storing encryption keys and a method for storing encryption keys.

Portable encryption devices, which may or may not incorporate mass storage of encrypted data, are widely used for securing user data. One example of such portable encryption devices is the secure flash drive, such as iStorage datAshur PRO². When data is transferred from a host computer to datAshur PRO², it will be encrypted on-the-fly by crypto hardware in the device. Similarly, the data will be decrypted on-the-fly when it is transferred from datAshur PRO² to the host computer. Another example of a portable encryption device may be one without storage, such as the iStorage cloudAshur. The cloudAshur performs real-time encryption/decryption on the data received from a host computer, depending on the respective instruction received along with the data. These portable encryption devices in general offer one data encryption key only. There might be one or more users registered with each device, where each user has a corresponding user ID and the device identifies and authenticates a given user via a password or other identification information, but all user IDs all relate to a single data encryption key.

According to a first aspect, there is provided a portable device for connection to a computer and for storing encryption keys. The portable device comprises: a first connector for connection to the computer; an internal memory; an input module; and an authentication module for receiving user identification information, via the input module, from a user. The authentication module is configured to check received user identification information against stored user identification information stored on the internal memory to determine if a user is a valid user. A first data encryption key, DEK, is stored in encrypted form on the internal memory and is associated with the stored user identification information of a first plurality of user identities, and a second DEK is stored in encrypted form on the internal memory and is associated with the stored user identification information of a second, different, plurality of user identities. When a user enters user identification information corresponding to stored user identification information of one of the first plurality of user identities, the authentication module is configured to decrypt the first DEK for use, and when a user enters user identification information corresponding to stored user identification information of one of the second plurality of user identities, the authentication module is configured to decrypt the second DEK for use.

The first DEK is different from the second DEK.

That is, the first plurality of user identities forms a first set and the first DEK is associated with the first set. The second plurality of user identities forms a second (different) set, and the second DEK is associated with the second set.

A given individual user may have multiple user identities and these multiple identities may be in the same set or may be in different sets. Different user identities may have differing levels of permissions or other functionality. For example, a given individual user may have both an administrator identity and a regular identity. When that user accesses the device using their administrator identity, the user may have additional privileges on the device, such as adding a new user identity, resetting the device, generating a new DEK, deleting other user identities etc.

Alternatively, some or all individual users may each have only one user identity.

Alternatively, multiple users may have different user identities within the same set. Thus, for example, an administrator may have an administrator identity in a set, while a different user has a standard user identity in that same set.

The device comprises a first connector for connection to the computer, wherein, when the authentication module has decrypted a given DEK, the device is configured to encrypt or decrypt data received from the computer using the given DEK.

The portable device may be a dongle that connects to the computer. The portable device may therefore be used as a portable and removable means for encrypting and decrypting data stored on the computer. Encryption and decryption may be performed on-the-fly, i.e. without data being stored in a memory of the device. That is, the data is only on the device for the time needed to receive the data, encrypt/decrypt it as appropriate, and return it immediately to the computer.

The device may be configured to provide the encrypted or decrypted data back to the computer. In one example, the device returns encrypted data to the computer. Thus, the data now stored on the computer is encrypted using the given DEK and, as such, the encrypted data is only accessible in unencrypted form to users having that DEK. Thus, when a given piece of data is encrypted using the second DEK on the device, only users in the second plurality of users can decrypt that data at a later stage. The user decrypting the data may be the same as the user who initially encrypted the data, or it may be a different user, provided both users have user identities in the second plurality of users. Users having user identities (only) in the first plurality of user identities may not decrypt the data, as these users only have access to the first DEK, which is different from the second DEK.

The user identification information may be one of a PIN, a password, an alphanumeric code, thumbwheel code, or biometric information. That is, the input module may comprise one or more of a touchscreen, a physical keypad, and a biometric scanner (e.g. a fingerprint scanner or iris scanner) for receiving the user identification information. The user may then set their desired identification information in the appropriate format when first setting up a new user identity.

Optionally, the user identification information itself is not stored on the internal memory. Instead, derived user identification information may be stored. In one example of this, on initial setup of a new user identity, the device generates a random number to be associated with that user identity. The random number and the user identification information (e.g. the PIN that is entered by the user doing the setup) and the DEK are then input into one or more algorithms to produce an encrypted DEK. The encrypted DEK and the random number are stored together on the internal memory as the "derived user identification information" for that user, and the user identification information itself is not stored. When that user next enters his/her user identification information (e.g. PIN), this user identification information is used as one input to an authentication algorithm, and the stored random number and the stored encrypted DEK that are associated with that user are used as other inputs to the authentication algorithm. The authentication algorithm then determines, based on these inputs, whether the user identification information is correct or not (i.e. whether it corresponds to a valid user identity).

In this setup, each user identity on the device comprises the random number associated with that user identity and a copy of the encrypted DEK. As described above, each user in the first plurality of users has the same (first) DEK but, because the PIN and random number are different for each user, the encrypted DEK that is stored along with each user identity will be different. That is, there are multiple copies of the first DEK stored in the device, one for each user in the first plurality of users, where each copy of the first (i.e. unencrypted) DEK is encrypted differently. This same arrangement applies equally to the second DEK and the second plurality of users etc.

The internal memory may comprise one or more additional data encryption keys; wherein each of the one or more additional data encryption keys is stored in encrypted form on the internal memory and is associated with the stored user identification information (or with the derived user authentication information) of a respective plurality of user identities; and wherein when a user enters user identification information corresponding to stored user identification information (or corresponding to derived user authentication information) of a given plurality of user identities, the authentication module is configured to decrypt the respective DEK for use.

That is, the device is not limited to two separate DEKs, but may contain additional DEKs. Each DEK is associated with a particular plurality of user identities (i.e. with a particular set of users). When a user enters identification information associated with a user identity in a given set, the DEK associated with that given set is the one that is decrypted and released for use by the device.

Each DEK stored on the device is different from every other DEK stored on the device.

The device may comprise a second connector for connection to a second electronic device, and the device may be configured to provide receive data from the computer via the first connector, to encrypt the data using the given DEK, and to provide the encrypted data to the second electronic device via the second connector.

Data may be encrypted/decrypted on-the-fly, i.e. without data being stored in a memory of the device. That is, the data is only on the device for the time needed to receive the data from one of the second electronic device and the computer, encrypt/decrypt it as appropriate, and pass it immediately to the other of the second electronic device and the computer.

The second electronic device may be any of an external hard drive, SD card, microSD card, or flash drive. In this case, the data received from the computer is encrypted before it is stored on the second electronic device (i.e. external hard drive). In this way, the user can ensure that data stored on the hard drive is encrypted, using a DEK that is associated with a user identity in a given plurality of user identities (i.e. in a given set). Other users having a user identity in that same plurality of users may also access the same DEK and so those users can also decrypt the data stored on the second electronic device. However, users of the device who do not have a user identity in that specific plurality of user identities (i.e. in that set) cannot decrypt the data, as they are not granted access to that specific DEK when they unlock the device.

The device may comprise a second internal memory, and the device may be configured to encrypt data received from the computer via the connector, using the given DEK, and to store the encrypted data on the second internal memory, and to decrypt data received from the second internal memory using the given DEK.

The second internal memory may be divided into a plurality of partitions, wherein the data on each partition is encrypted with a different one of the DEKs. This may ensure that all data on a given partition is encrypted using the same DEK.

Each DEK stored in the internal memory may be randomly generated by a FIPS random number generator stored in the device when the device is first set up. In this way, each set of users, i.e. each plurality of users, may have a newly generated DEK for use in the device. This can increase security as there is no master list of DEKs outside the device that could be revealed in a data breach.

Some examples of the device may only use the internal memory for storing DEKs and user identities along their associated identification information. That is, the internal memory is not used for storing any data that is received from either of the computer or second electronic device. In devices having a second internal memory, any data that is stored on the device from the computer may be stored on a second internal memory that is separate from the first internal memory. The internal memory may be a hardware module of the authentication module. That is, the internal memory may be integrally formed with the authentication module.

As described above, either the user identification information or the derived user identification information is stored on the memory and is associated with a given DEK.

All devices according to the above-discussed aspects are configured such that none of the DEKs are ever transferred out of the device. That is, the DEK may be never transferred to the computer via the first connector, nor to the second electronic device via the second connector (if present). This helps ensure the security of the DEKs stored on the device. As such, a computer that is using the device to encrypt/decrypt data does not have any knowledge of what the DEK may be. This means that a malicious user who has hacked into the computer does not gain knowledge of the DEKs stored in and used by the device. Similarly, a malicious user who has gained access to the external hard drive/second electronic device cannot find the relevant DEK for decrypting data stored thereon on the hard drive itself. This can increase the security of the encrypted data stored on the hard drive.

Within each plurality of users (i.e. set), the various user identities may be used for specific functions. For example, one user identity may be an Admin ID having some administrative features, while an standard user identity may only be eligible to perform the basic features, e.g. encryption/decryption using the associated DEK.

In another aspect, there is provided a system comprising the portable device according to any of the above aspects, and at least one of the computer and the second electronic device, wherein the second electronic device is an external memory.

According to another aspect, there is provided a method of storing encryption keys on a portable device, wherein the portable device is according to any of the devices described above. In the method, the first plurality of user identities is a first set and the second plurality of user identities is a second set. The method comprises: receiving user identification information at the input module; checking, by the authentication module, whether the received user identification information matches any stored user identification information stored in the memory; and, if not, the method ends; and, if so, determining which set that user identity is associated with; and, releasing and decrypting a data encryption key, DEK, associated with that set.

According to the method, there are a plurality of different DEKs stored on the device and each user may only gain access to a given DEK if that user has a user identity associated with that given DEK. This means that multiple users may share the device. A first user may use the device for encryption/decryption, while remaining confident that only other users having a user identity in the same set might have access to the first user's data. Other users of the device who have user identities only in a different set may not access the first user's data.

In some examples, the DEKs on a given device according to the present disclosure may be securely copied to another device. A suitable method of securely copying encryption keys between two devices is described in detail in United Kingdom Patent No. 2566107, to iStorage Ltd. In order to securely transfer a DEK of the present device to a second device, the present device requests a public key from the second device (or a public-private key pair), the present device encrypts one or more of the DEKs using the public key, and returns the encrypted DEK(s) to the second device. The second device then decrypts the DEK(s) using its private key. In this manner, the unencrypted DEK(s) are never seen by any intermediate device or network (e.g. a computer that the devices are connected to or the internet), thus enhancing the security of the transferred DEK(s).

The method may comprise the step of receiving data from the computer along with an instruction to encrypt or decrypt the data. The device may then encrypt or decrypt the data, in accordance with the instruction, using the released and decrypted data encryption key, to produce modified data. The modified data may be returned to the computer.

In this case, the data is "modified" either by being encrypted by the device or decrypted by the device, as appropriate.

The method may comprise the step of receiving unencrypted data from the computer; the device encrypting the data using the released and decrypted data encryption key; and passing the encrypted data to either a second internal storage on the device or to a second electronic device.

In this way, the device can function as an "encryption bridge" between the computer and the second electronic device. The device thereby ensures that all data passing through it from the computer to the second electronic device (or second internal memory) is stored encrypted.

The method may comprise the steps of receiving encrypted data from one of the internal storage or the second electronic device; decrypting the encrypted data using the released and decrypted data encryption key; and passing the decrypted data to the computer.

According to this method, the device may provide decrypted data to the computer, where the data was previously securely encrypted using the DEK.

Certain embodiments of the present disclosure will now be described in greater detail by way of example only and with reference to the accompanying drawings in which.

Figure 1:
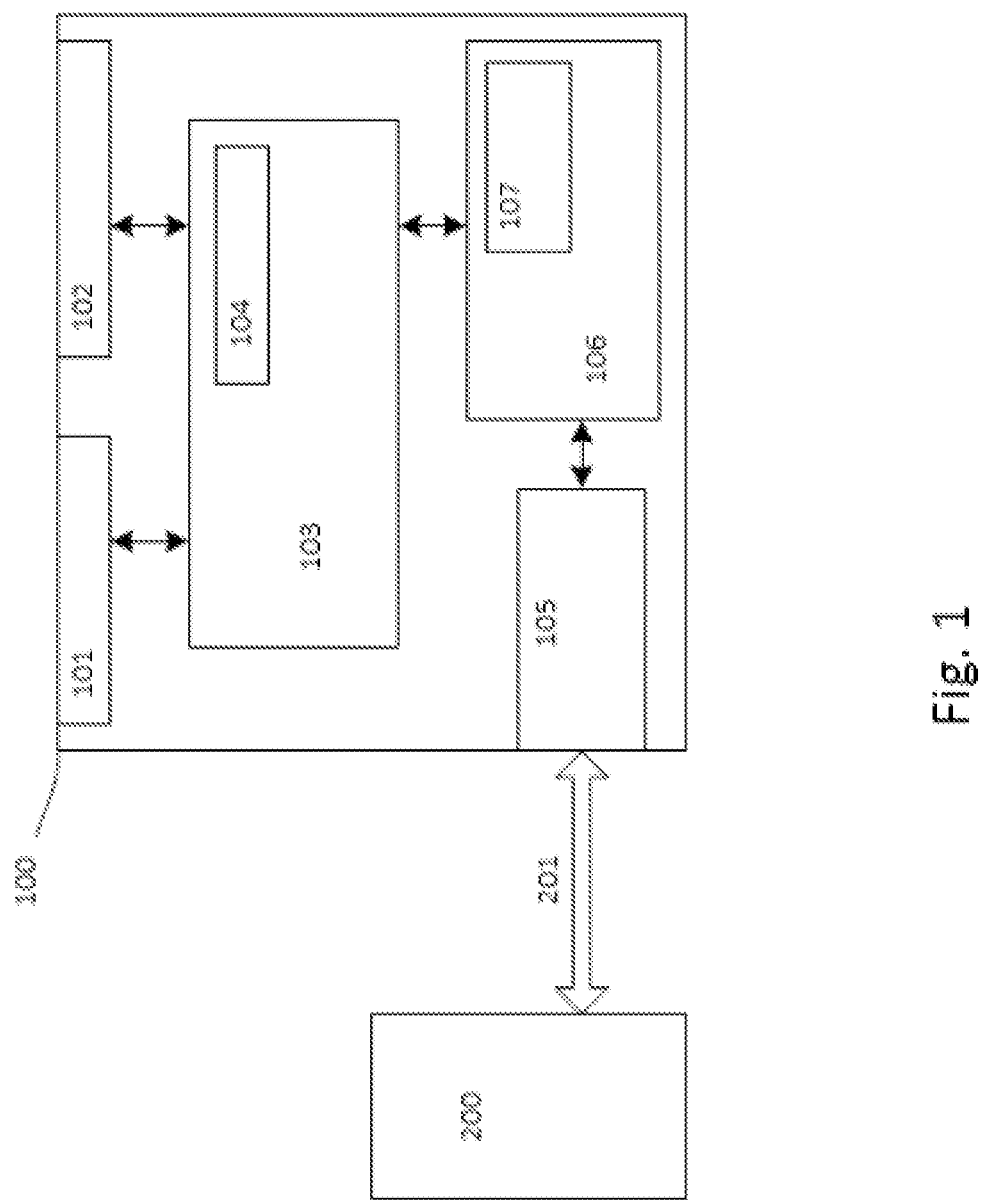
FIG. 1 shows a device for storing encryption keys.

FIG. 1 shows a device 100 for storing data encryption keys, DEKs. The device 100 comprises an input module 101 for receiving identification information from a user. Identification information may comprise any or all of a password, an alphanumeric code, a PIN, and a biometric input. A biometric input may be, for example, a fingerprint scan or an iris scan, by way of non-limiting example.

The device 100 further comprises a display module 102 for displaying information to a user. For example, the display may be as simple as an LED indicating the device is powered on, or the display module may be more complex and consist of an LCD screen for displaying data.

An authentication module 103 is connected to the input module 101 and the display module 102. The authentication module 103 contains or is connected to a memory 104. The memory 104 is solely used for storing user identification information, user identities, and data encryption keys, as well as any other data necessary for operating the device 100. The memory 104 is not used for storing data that is encrypted/decrypted by the device 100, e.g. data that has been received from either a computer or an external storage device connected to the device 100. The authentication module 103 is configured to receive identification information from a user and to check that against stored identification information in the memory 104. Valid identification information from a user is information that matches identification information that has previously been stored in the device 100, e.g. during initial device setup.

As described in more detail below, the memory 104 also stores a plurality of data encryption keys (DEKs).

The device comprises an interface controller 106 containing a crypto accelerator 107. The crypto accelerator 107 is a hardware- or firmware-implemented module dedicated to the encryption/decryption of data using a provided data encryption key. The interface controller 106 is configured to communicate with the authentication module 103 and with a first connector 105 of the device that is a communication module 105. The communication module 105 could be part of the interface controller 106, i.e. these can be integrally formed together as a single component. The authentication module 103 may also, additionally or alternatively, be part of the interface controller, i.e. as part of a single component.

The communication module 105 is configured to communicate, over a communication bus 201, with a computer 200 that the device 100 is removably connected to. The communication module may comprise, for example, a USB connector and the necessary logic to allow communication between the computer 200 and the interface controller 106, using an applicable USB standard (e.g. USB 2.0, USB 3.0 etc.). Other types of connection are also envisaged, including FireWire, a SATA interface, an eMMC interface, an SD/TF card interface, an NVMe/PCIe interface etc.

In operation, the device 100 is connected to, e.g. plugged into, the computer 200. The user then inputs their identification information into the input module 101. The authentication module 103 checks the received identification information against stored user identification information in the memory 104. If the user has entered valid user identification information, i.e. identification information that corresponds to a stored user identification information, then the authentication module 103 identifies the user identity this identification information is related to. As above, each user identity is associated with a given DEK. The authentication module 103 then retrieves the given DEK, i.e. the DEK associated with that user identity, from the memory 104 and provides this to the crypto accelerator 107 of the interface controller 106. The DEKs may be stored in an encrypted form on the memory 104, for additional security. In such cases, the authentication module 103 will decrypt the given DEK before it is passed to the crypto accelerator 107.

A data packet that is received by the device 100 from the computer 200 is passed by the communication module 105 to the interface controller 106 along with an associated command to encrypt or decrypt the data packet. The data packet is then passed to the crypto accelerator 107 and the interface controller 106 instructs the crypto accelerator 107 to encrypt/decrypt the data packet according to the associated command. The crypto accelerator 107 encrypts or decrypts the data packet accordingly, and returns the encrypted/decrypted data packet to the interface controller 106. The encrypted/decrypted data packet is then returned, via the communication module 105, to the computer 200. In this manner, data is encrypted or decrypted, as appropriate, on-the-fly by the device 100 and returned immediately to the computer 200. In this example device 100, data received from the computer 200 is not stored on the device 100. That is, there is no memory on the device 100 used for long-term storage of data received from the computer 200. Rather, data is only present on the device 100 for the time needed to receive the data, encrypt/decrypt it as appropriate, and return the data to the computer 200.

Figure 2:
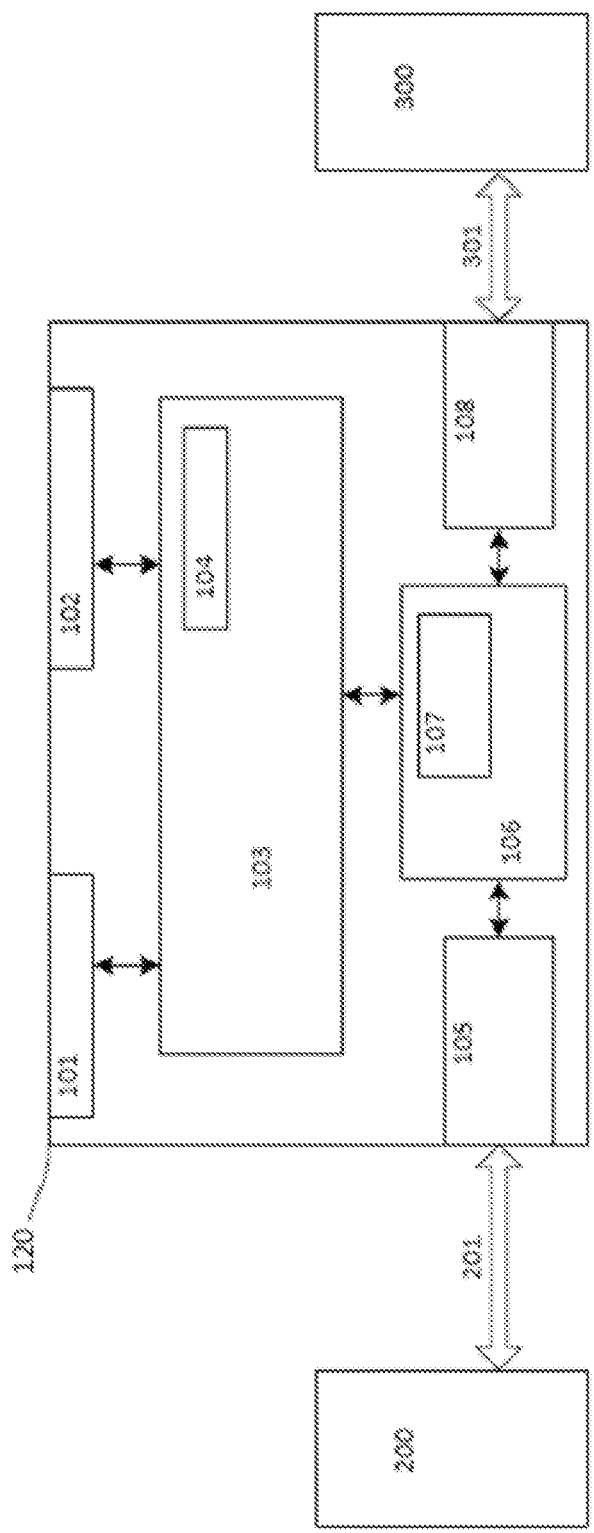
FIG. 2 shows another device for storing encryption keys.

Another example device 120 for storing encryption keys is shown in FIG. 2. The device 120 is similar to the device 100 of FIG. 1 and, where components are the same, the same reference numerals are used. As such, the following description will primarily focus on the different features of device 120 of FIG. 2.

Like the device 100 of FIG. 1, the device 120 comprises an input module 101, a display module 102, an authentication module 103, a memory 104 for storing user identification information and a plurality of DEKs, an interface controller 106, a crypto accelerator 107, and a first connector (communication module 105). A user of the device 120 is authenticated in the same manner as described above in relation to FIG. 1. Further, as in the FIG. 1 example, a given DEK is provided to the crypto accelerator 107 when a given user has been successfully authenticated.

As with the device 100 of FIG. 1, the memory 104 is not used for storing data that is encrypted/decrypted by the device 120.

The device 120 further comprises a second connector 108 that is a communication module 108. This second communication module 108 is connected to the interface controller 106. The second communication module 108 is configured to communicate, over a communication bus 301, with an external storage device 300 that the device 120 is removably connected to. The second communication module 108 may comprise, for example, a USB connector and the necessary logic to allow communication between the external storage device 300 and the interface controller 106, using an applicable USB standard (e.g. USB 2.0, USB 3.0 etc.). Other types of connection are also envisaged, including FireWire, an eMMC interface, a SD/TF card interface, an NVMe/PCIe interface or an SATA interface etc.

The external storage 300 may be any of an external hard drive, an SD card, a flash drive etc.

In operation, the device 120 receives a data packet from either of the computer 200 or the external storage device 300. The device 120 may be configured to interpret from context whether to encrypt the received data packet or to decrypt it. For example, a write command from the computer 200 may be automatically interpreted as a command to encrypt the data packet received from the computer 200. Similarly, a read command from the computer 200 may be automatically interpreted as a command to decrypt the relevant data packet. Alternatively, the computer 200 may send an associated command along with each data packet, where the associated command indicates whether the data packet should be encrypted or should be decrypted.

The device 120 therefore receives data from one of the electronic devices 200,300, encrypts/decrypts the data as required (or in accordance with the associated command), and passes it on to the other of the two devices 200,300.

In the case where the external storage device 300 is used only to store encrypted data, the associated command may not be provided. Instead the interface controller 106 may be configured to automatically instruct (i.e. instruct the crypto accelerator 107) that data packets going to the external storage device 300 must be encrypted, and that data received from the external storage device 300 (and thus going to the computer 200) must be decrypted.

A plaintext (i.e. unencrypted) data packet received by the device 100 from the computer is encrypted by the crypto accelerator 107 using the given DEK and the cyphertext (i.e. encrypted data packet) is passed to the second communication module 108 and thence to the external storage device 300.

A ciphertext data packet received from the external storage device 300 is received by the device 120 via the second communication module 108. The ciphertext data packet is passed to the crypto accelerator and decrypted using the given DEK if possible, i.e. if the correct DEK has been decrypted and released by the authentication module 103. As the device 120 contains a plurality of DEKs and only the correct DEK (or, depending on the encryption scheme, a plurality of correct DEKs) will decrypt the received ciphertext data packet. As such, the (or a) correct DEK must be used to decrypt the ciphertext data packet. Different DEKs will be used by different users, as described in detail below, and this feature means that data that was previously encrypted by one user, and stored on the external storage device 300, may or may not be able to be decrypted by another user, depending on who the user is and the setup of the device 120.

Assuming that the given DEK is suitable to decrypt the ciphertext packet, the crypto accelerator 107 decrypts the data packet and the plaintext data packet is then provided to the computer 200 via the first communication module 105.

The device 120 of FIG. 2 thus acts as an encryption bridge between the computer 200 and external storage device 300. That is, all data passing from the computer 200 to the external storage device 300 is encrypted on-the-fly by the device 120. Similarly, all data passing from the external storage device 300 to the computer 200 will be decrypted (if possible) on-the-fly by the device 120.

Figure 3:
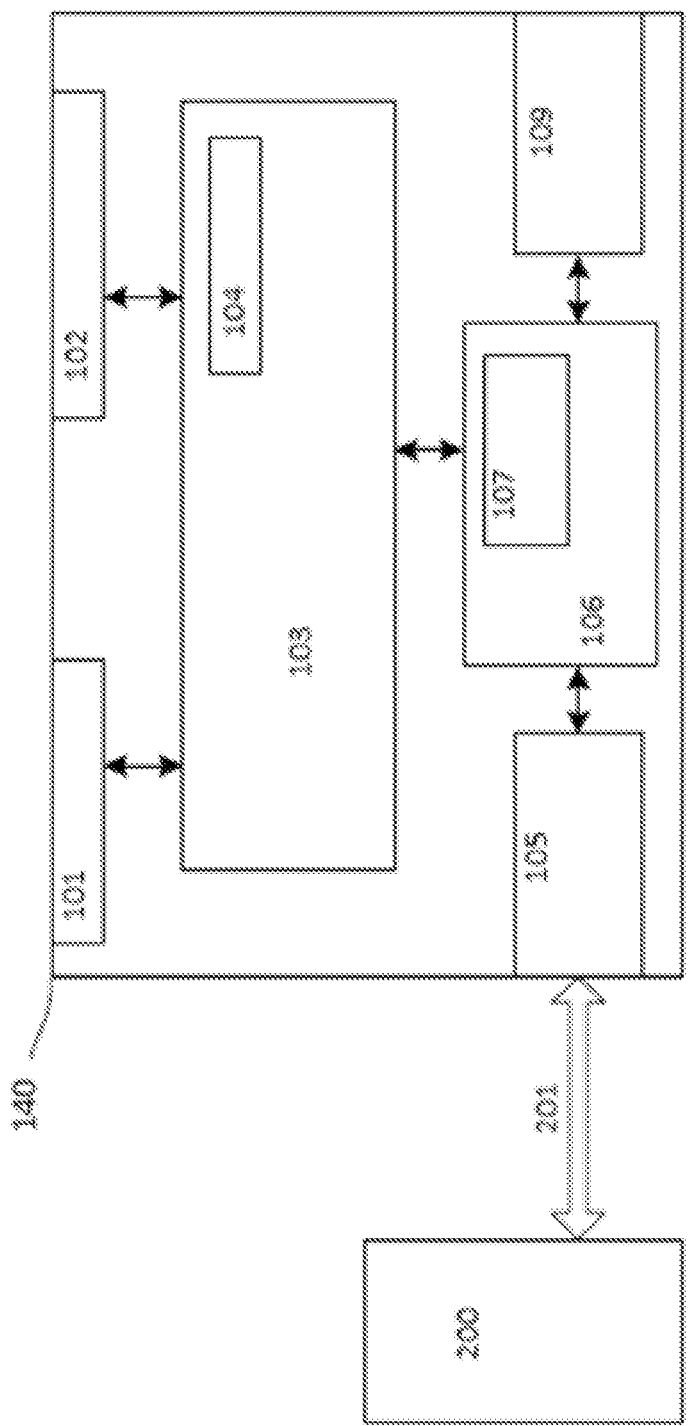
FIG. 3 shows a third device for storing encryption keys, having internal storage.

A third example device 140 for storing encryption keys is shown in FIG. 3. The device 140 of FIG. 3 is substantially the same as the device 120 of FIG. 2, except that the device 140 has an internal storage 109 that is used for long-term storage of data received from the computer 200. This is instead of the device having a second communication module 108 and there being an external storage device 300 present. The other components of the device 140 are the same as the first 100 and second 120 examples, shown in FIGS. 1 and 2 respectively.

As such, during operation, the device 140 of FIG. 3 receives plaintext data packets from the computer 200. The data packets are encrypted on-the-fly by the crypto accelerator 107 using the given DEK and then stored in encrypted form on the internal storage 109. The internal storage 109 is separate and distinct from the memory 104 that stores the user identification information and plurality of DEKs.

Similarly, when the computer 200 requests a data packet stored on the internal storage 109, the device 140 decrypts the data packet (if possible) on-the-fly and passes the plaintext data packet to the computer 200 via the communication module 105.

As noted above, the memory 104 (of all examples, i.e. of devices 100, 120, and 140) stores a plurality of different DEKs. The authentication module 103 controls access to these DEKs based on the identification information received by the input module 101. The setup of this storage and control will now be described with reference to FIGS. 4 and 5. The following arrangement applies to all example devices described herein above, i.e. devices 100, 120, and 140.

Each individual user will set up one or more user identities (user IDs) on the device 100,120,140 during initial setup. Each user identity has associated user identification information that is stored on the memory 104. The user identification information may be a PIN, a password, an alphanumeric code, a biometric input etc.

The user identities are divided into sets, where each set is associated with a single DEK out of the plurality of DEKs stored on the memory 104. Each set contains a plurality of user identities. Each set may contain a different number of user identities from any other set. In the example shown in FIG. 4, there are "m" user identities in Set #1. These are user identity $ID_{11}$, user identity $ID_{12}$ etc., all the way to user identity $ID_{1m}$. All of these user identities $ID_{11}$ to $ID_{1m}$ are associated with the first data encryption key DEK #1. This means that whenever the authentication module 103 determines that a user in Set #1 has input valid user identification information, the authentication module 103 obtains (and, decrypts, if necessary) the first DEK, DEK #1, and provides this to interface controller 106 for use by the crypto accelerator 107.

Figure 4:
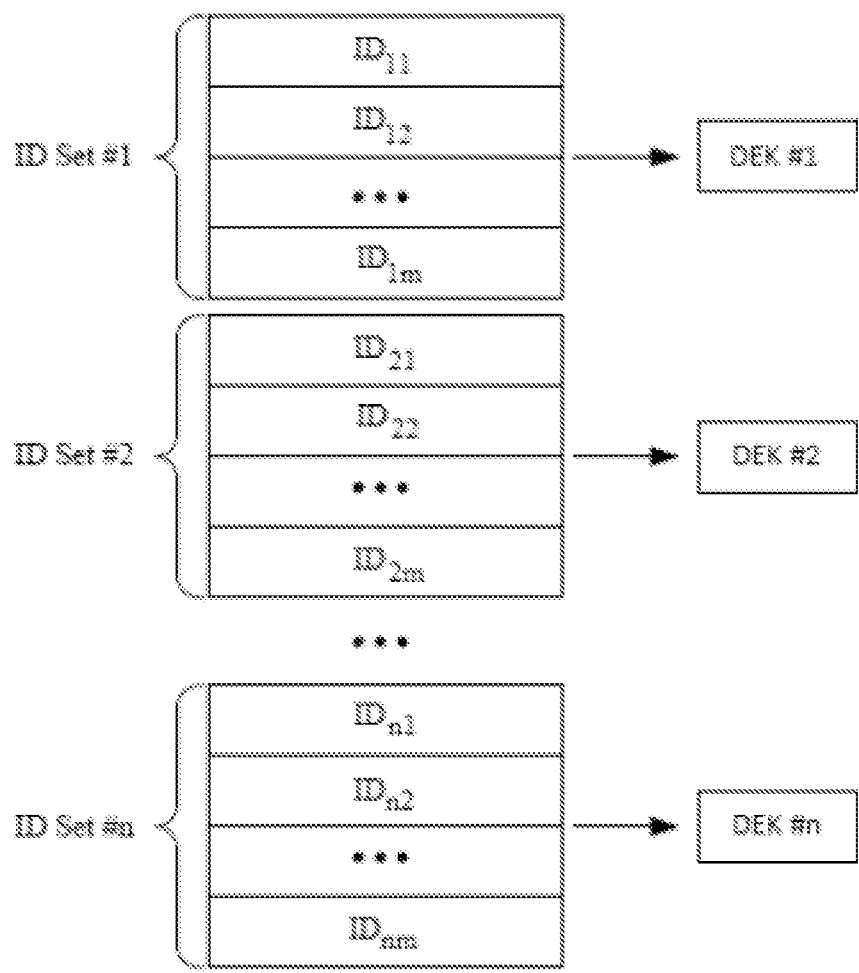
FIG. 4 shows a relationship between User IDs and encryption keys.

There are also, in FIG. 4, "m" user identities associated with the second set, Set #2. These are user identity $ID_{21}$, user identity $ID_{22}$, etc. all the way to user identity $ID_{2m}$. Whenever the authentication module 103 determines that a user in Set #2 has input valid user identification information, the authentication module obtains (and, decrypts, if necessary) the second DEK, DEK #2, and provides this to interface controller 106 for use by the crypto accelerator 107. Any number of sets may be set up, where each set is associated with its own DEK. In the example shown in FIG. 4, there are a total of "n" sets.

Every user identity is associated with a set, and therefore with a given DEK. A given user may have user identities in multiple different sets. For example, an administrator user may have a user identity in every single set, so that the administrator can obtain access to every single DEK if required. Alternatively, a given user may have multiple identities within the same set. In this case, the different user identities may give the user access to the same DEK but the different identities may have different associated privileges or functionalities. For example, one identity in the set may give standard-user privileges, another in the same set may give administrator-level privileges, and a further identity in the set may be a one-time-recovery user identity. The aforesaid given user may optionally have all of the identities within a given set.

Optionally, the device may be configured such that each individual user has his/her own set having multiple identities, such that each individual user has a single associated DEK that is only associated with that individual user, and that user has multiple identities within his/her set giving different privileges or functionalities, as above.

Figure 5:
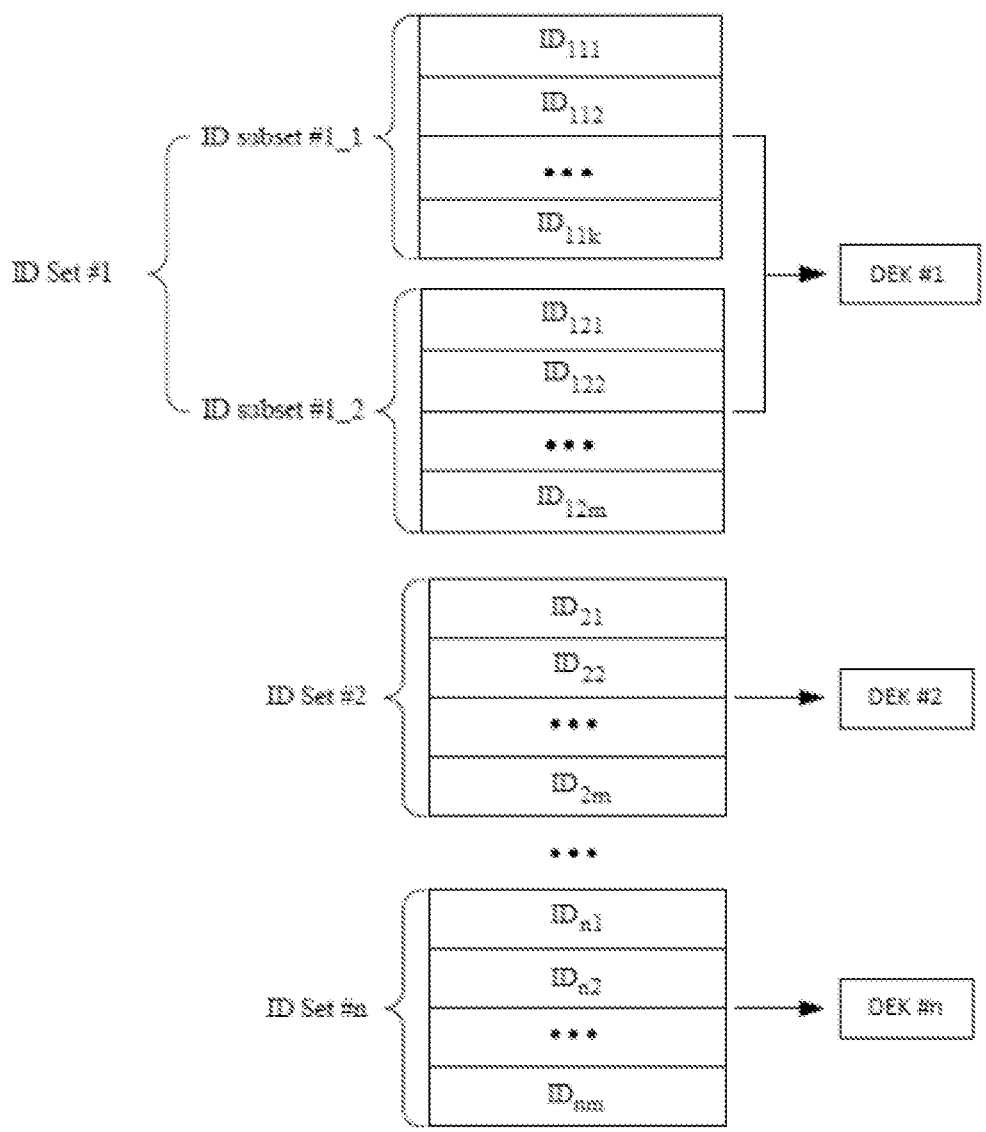
FIG. 5 shows another relationship between User IDs and encryption keys.

FIG. 5 shows the first set, Set #1, divided into two subsets of user identities, subset #1_1 and subset #1_2. The "subset #1" identifies each of the two subsets as belonging to Set #1 (and thus being associated with DEK #1) and the "_1" and "_2" identify which of the two subsets is which. As before, the overall set, i.e. Set #1, is associated with a single DEK, DEK #1. The subsets may therefore provide an administrative benefit, while remaining part of the overall set. Each individual user may have one or several user identities. Each user's identity/identities may therefore be grouped together as a subset within a given set. This may make it easier to e.g. delete all user identities for a given user in one go, by identifying the relevant subset associated with that individual user. Any or all of the sets, e.g. Set #1, Set #2, Set #3 . . . , may be divided into subsets, as desired.

Each set, e.g. Set #1, Set #2, Set #3, may have the same number of user identities as another set, or the sets may have different numbers of user identities.

Figure 6:
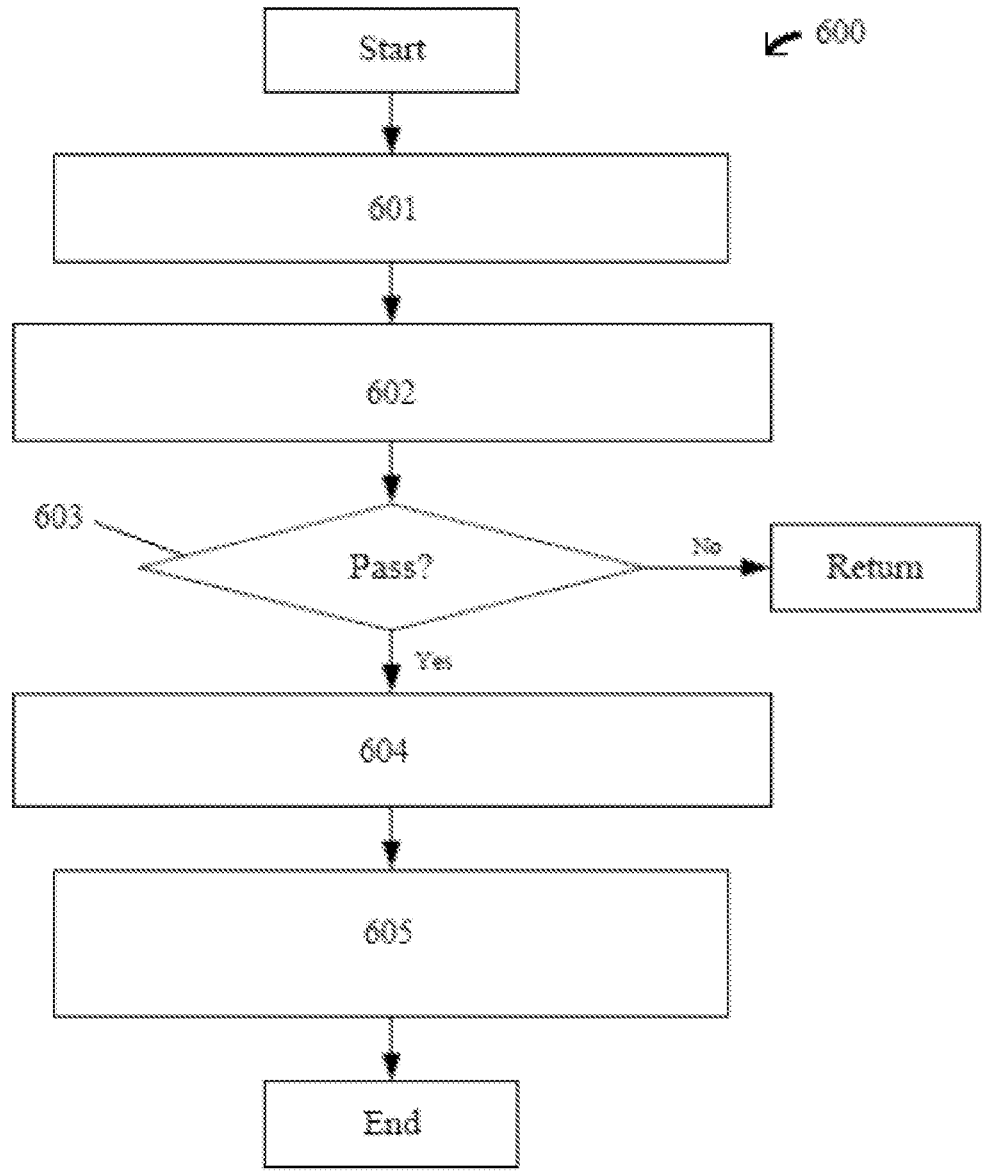
FIG. 6 shows a flow diagram of obtaining a given DEK.

FIG. 6 shows a flow diagram of obtaining a given DEK. The method 600 is as follows:

Step 601—a user enters identification information at the input module 101.

Step 602—the authentication module 103 checks to see if the identification information matches any stored user authentication information (or derived authentication information, as appropriate) in the memory 104.

Step 603—if the authentication information does not match any user identity (i.e. is invalid) the process ends, if the identification information does match (i.e. is valid), the process continues to step 604.

Step 604—the authentication module 103 identifies which set that user identity is associated with, out of the plurality of sets.

Step 605—the authentication module 103 decrypts and releases the DEK associated with that set, and provides it to the interface controller 106.

The invention claimed is:

1. A portable device for connection to a computer, the portable device for storing encryption keys, the portable device comprising:
a first connector for connection to the computer;
an internal memory;
an input module; and
an authentication module for receiving user identification information, via the input module, from a user,
wherein the authentication module is configured to authenticate received user identification information,
wherein a first data encryption key, DEK, is stored in encrypted form on the internal memory and is associated with a first plurality of user identities, and
wherein a second DEK is stored in encrypted form on the internal memory and is associated with a second, different, plurality of user identities,
wherein, when a user enters user identification information corresponding to one of the first plurality of user identities, the authentication module is configured to decrypt the first DEK for use, and
wherein, when a user enters user identification information corresponding to one of the second plurality of user identities, the authentication module is configured to decrypt the second DEK for use, wherein, when the authentication module has decrypted a given DEK, the device is configured to encrypt or decrypt data received via the first connector using the given DEK;

wherein the portable device is configured such that the DEKs are never transferred out of the portable device;

wherein derived user identification information for each of the user identities is stored on the internal memory and is associated with its given DEK; and wherein the user identification information and an initially generated random number, and the DEK are entered as inputs to an algorithm that produces an encrypted DEK, and wherein the encrypted DEK and the random number are stored together as the derived user identification information for that user identity on the internal memory, and the user identification information is not stored on the internal memory.

2. The portable device according to claim 1, wherein the input module is suitable for receiving at least one of a PIN, a password, an alphanumeric code, thumbwheel code, or biometric information from a user.

3. The portable device according to claim 1, wherein the internal memory comprises one or more additional data encryption keys, DEKs;

wherein each of the one or more additional data encryption keys is stored in encrypted form on the internal memory and is associated with a respective plurality of user identities; and wherein when a user enters user identification information corresponding to a given plurality of user identities, the authentication module is configured to decrypt the respective DEK for use.

4. The portable device according to claim 1, wherein the portable device is configured to provide the encrypted or decrypted data back to the computer.

5. The portable device according to claim 1, wherein the portable device comprises a second connector for connection to a second electronic device, and wherein the device is configured to receive data from the computer via the first connector, to encrypt the data using the given DEK, and to provide the encrypted data to the second electronic device via the second connector.

6. The portable device according to claim 1, wherein the portable device comprises a second internal memory, and wherein the portable device is configured to encrypt data received from the computer via the first connector, using the given DEK, and to store the encrypted data on the second internal memory, and to decrypt data received from the second internal memory using the given DEK.

7. A system comprising: the portable device according to claim 1, and at least one of the computer and the second electronic device, wherein the second electronic device is an external memory.

8. A method of storing encryption keys on a portable device, wherein the portable device is the portable device according to claim 1, and wherein the first plurality of user identities is a first set and the second plurality of user identities is a second set;

the method comprising:
receiving user identification information at the input module;
authenticating, by the authentication module, the received user identification information to authenticate the user; wherein
if the user identification information is not valid, the method ends; and
if the received user identification information is valid, then the method includes
determining which set that user identity is in; and
releasing and decrypting the DEK associated with that set.

9. The method according to claim 8, comprising the step of receiving data from a computer along with an instruction to encrypt or decrypt the data;

the portable device encrypting or decrypting the data, in accordance with the instruction and using the released and decrypted data encryption key, to produce modified data; and
returning the modified data to the computer.

10. The method according to claim 8, comprising the step of receiving unencrypted data from a computer;

the device encrypting the data using the released and decrypted data encryption key; and
passing the encrypted data to either a second internal storage on the portable device or to a second electronic device.

11. The method according to claim 8, comprising the steps of receiving encrypted data from one of the internal storage or the second electronic device;

decrypting the encrypted data using the released and decrypted data encryption key; and
passing the decrypted data to the computer.

* * * * *